United States Patent [19]

Anderson

[11] 4,143,942
[45] Mar. 13, 1979

[54] FIBER OPTIC CABLE AND METHOD OF MAKING SAME

[75] Inventor: Gene S. Anderson, Batavia, Ill.

[73] Assignee: Belden Corporation, Geneva, Ill.

[21] Appl. No.: 735,403

[22] Filed: Oct. 26, 1976

[51] Int. Cl.² ............................................. G02B 5/16
[52] U.S. Cl. ................................. 350/96.23; 156/172
[58] Field of Search ........................ 350/96 B, 96.23; 174/116, 113 C; 57/148; 156/172

[56] References Cited

U.S. PATENT DOCUMENTS

| 3,883,218 | 5/1975 | Slaughter | 350/96 B |
| 4,037,923 | 7/1977 | Beal | 350/96 B |

FOREIGN PATENT DOCUMENTS

| 2265108 | 10/1975 | France | 350/96 BR |
| 2291508 | 6/1976 | France | 350/96 BR |
| 2294460 | 7/1976 | France | 350/96 BR |

*Primary Examiner*—John K. Corbin
*Assistant Examiner*—Stewart Levy
*Attorney, Agent, or Firm*—Fitch, Even, Tabin & Luedeka

[57] ABSTRACT

A fiber optic cable and method of making same are disclosed wherein one or more fiber optic elements are carried along the length of an elongate strength member, a tape is applied coaxially over the fiber optic elements and elongate strength member to establish a cable core, and a protective jacket is disposed coaxially over the cable core. The tape maintains the fiber optic elements and elongate strength member in assembled relation, provides a heat barrier and facilitates stripping of the jacket without disturbing the cable core. A filler material may be interposed between the jacket and the taped cable core.

12 Claims, 4 Drawing Figures

FIBER OPTIC CABLE AND METHOD OF MAKING SAME

The present invention relates generally to fiber optic cables, and more particularly to a novel fiber optic cable construction wherein one or more fiber optic elements are carried by an elongate strength member and have a tape applied along the length thereof to establish a cable core over which a protective jacket is coaxially disposed, the tape maintaining the fiber optic elements and elongate strength member in assembled relation and providing a heat barrier while facilitating stripping back of the coaxial jacket without disturbing the fiber optic elements.

Much effort has been expended in recent years in the design and development of low-loss fiber optic cables for various applications, including the field of communications. Low-loss fiber optic cables offer many desirable advantages over metallic conductors including use for long distance transmission without repeaters, immunity from crosstalk, greater bandwidth capabilities, lighter weight, and potential for lower cost signal communication systems.

In practice, however, it has been found that significant problems are presented which inhibit utilization of the desirable features of fiber optic cables over metallic conductors. One basic problem in fiber optic cables is the inherent fragility of glass fibers so that the fiber optic cables made therefrom are flexible and can withstand bending, twisting, impact, vibration, etc. The basic approach has been to provide means for strengthening and buffering the individual fiber optic elements so that subsequent bundling, cabling and field usage will not cause fiber breakage or have adverse effect on the optical properties of the fibers.

It is generally acknowledged that failures in the optic fiber elements ultimately stem from surface flaws or imperfections in the fibers. The stress concentration at such surface flaws can be many times greater than the nominal stress at the same point, and since there is no axial yielding in the glass fibers, the stress at the surface flaws cannot be relieved. If a high tensile stress is applied to the glass fibers, the surface flaws may propagate with eventual failure of the fibers. Thus, it is necessary that the fiber optic elements be protected so that the surfaces of the fiber optic elements are not nicked or otherwise damaged to create points of high stress concentration, while at the same time facilitating stripping back of protective jackets or the like without endangering the fiber optic elements.

It is a general object of the present invention to provide a ruggedized fiber optic cable which has high axial strength, exhibits substantial flexibility and is resistant to substantial crushing forces. A more particular object of the present invention is the provision of a fiber optic cable construction wherein the various elements are made of non-metallic materials, wherein one or more fiber optic elements are carried along an elongate strength member, and wherein a tape is wrapped coaxially about the fiber optic elements and the elongate strength member to establish a cable core over which is disposed a protective jacket. The tape covering over the fiber optic elements and elongate strength member retains them in a formed bundle, provides a heat barrier and facilitates stripping back of the protective jacket and any filler material interposed between the jacket and the core without exposing the fiber optic elements to forces which might nick or mar the surfaces of the optic elements and create points of high stress concentration.

The various objects and features of the present invention will become apparent from the following detailed description of the invention when taken in conjunction with the accompanying drawing wherein like reference numerals designate like elements throughout the several views, and wherein.

Figure 1:
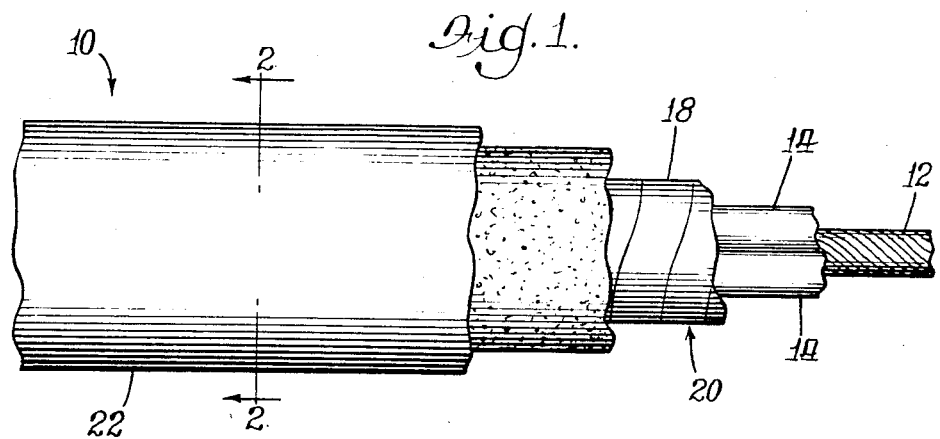
FIG. 1 is an elevational view of a length of fiber optic cable constructed in accordance with the present invention, the various layers being broken away to better show the construction.

Referring now to the drawing, and in particular to FIG. 1, a fiber optic cable constructed in accordance with one embodiment of the present invention is indicated generally at 10. As will become more apparent hereinbelow, the fiber optic cable 10 is made from non-metallic elements and exhibits high axial strength characteristics while being flexible and resistant to crushing.

Figure 2:
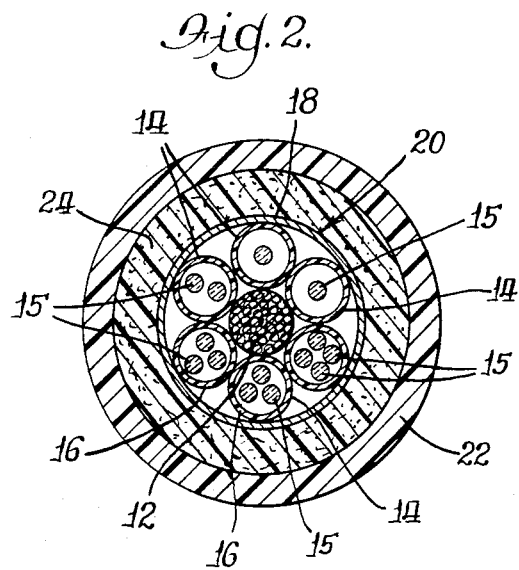
FIG. 2 is an enlarged transverse sectional view of the fiber optic cable construction shown in FIG. 1, taken substantially along the line 2—2 of FIG. 1.

In the embodiment of the fiber optic cable 10 illustrated in FIGS. 1 and 2, an elongate strength or support member 12, which extends the full longitudinal length of the cable, has a plurality of fiber optic element bundles, each of which is indicated at 14, cabled therearound along the full length of the elongate strength member 12.

The fiber optic element bundles 14, of which there are six shown in FIG. 2, are of known construction and each includes one or more fiber optic elements 15 having a coaxial sheath 16 formed thereon along the length of the fiber optic elements. The coaxial sheaths are preferably formed from a polymer containing poly acrylonitrile. This provides the fiber optic elements with protective sheaths which are flexible yet sufficiently rigid to provide crush resistance. Such sheaths have low elongation at yield, i.e. about 5%, and can be extruded with little shrink back. Such sheaths also facilitate stripping to thus simplify termination of the fiber optic cables. The elongate strength member 12 is selected so as to have greater tensile strength and lower elongation per unit length than the fiber optic elements 15. The elongate strength member 12 preferably comprises a relatively high strength yarn having the desired strength characteristics. For example the elongate strength member 12 may be made from a suitable aramid an example of which is KEVLAR, a product of DuPont Company.

As used herein, the term "cabled" refers to conventional techniques of helically winding one or more elongate elements or bundles of fiber optic elements about each other or about an elongate carrier or support member which may be disposed axially of the cabled elements. Thus, in the fiber optic cable 10 illustrated in FIG. 2, the fiber optic bundles 14 are cabled around the axial strength member 12.

In accordance with the illustrated embodiment, a tape is wrapped around the cabled fiber optic bundles 14 and axial strength member 12 to provide a tape layer 18 which extends the full length of the cable to coaxially cover the cabled fiber optic bundles and axial strength member. The tape forming the tape layer 18 may comprise a PVC tape or other suitable tape material which establishes a cable core, indicated generally at 20, by securing the fiber optic bundles and axial strength member together in fixed relation. The tape layer 18 also provides a heat barrier for the fiber optic elements 15 and facilitates stripping back of an outer protective jacket 22 to be described.

In the embodiment of the fiber optic cable 10 illustrated in FIGS. 1 and 2, an outer protective jacket 22 is formed about and coaxial with the core 20. The jacket 22 preferably comprises an extruded plastic material such as a suitable extruded thermoplastic elastomer. The jacket 22 may be extruded over the taped core 20 in intimate contact with the external surface of the tape 18 and has a radial thickness suitable to provide the desired flexibility for the fiber optic cable 10. Alternatively, the jacket 22 may be radially spaced from the core 20, as shown in FIG. 2, and a foam layer 24 may be interposed between the cable core 20 and the jacket 22. The foam layer 24 may comprise an extruded foamed plastic which is applied to the core 20 prior to extruding the jacket 22 thereover, or may comprise a suitable filler foam material which is inserted between the core 20 and jacket 22 simultaneously with forming the jacket.

Figure 3:
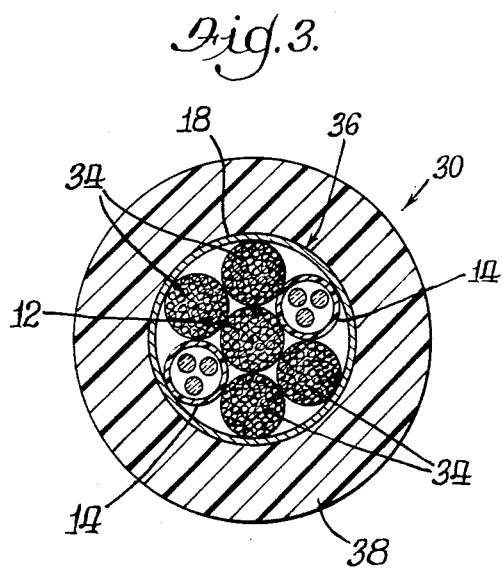
FIG. 3 is a transverse sectional view of an alternative embodiment of a fiber optic cable construction in accordance with the present invention.

FIG. 3 illustrates an alternative embodiment of a fiber optic cable constructed in accordance with the present invention, such alternative embodiment being indicated generally at 30. The fiber optic cable 30 includes an elongate axial strength member 12 identical to the elongate strength member 12 of the optic cable 10. In the embodiment of FIG. 3, two fiber optic bundles 14 and four elongate cylindrical filler strand members 34 circumferentially interposed in pairs between the optic bundles 14 are cabled about the length of the axial strength member 12. The filler strands 34 cooperate with the fiber optic bundles 14 to provide a generally outer cylindrical surface upon which is a tape 18 is wrapped to establish a cable core, indicated generally at 36, generally similar to the cable core 20 of the fiber optic cable 10 illustrated in FIG. 1.

An outer coaxial jacket 38 is formed over the cable core 36 in contact with the tape 18 of the cable core. The jacket 38 may be formed by extruding and, as an alternative structure, may be radially spaced from the core 36 and a suitable filler foam material interposed therebetween.

Figure 4:
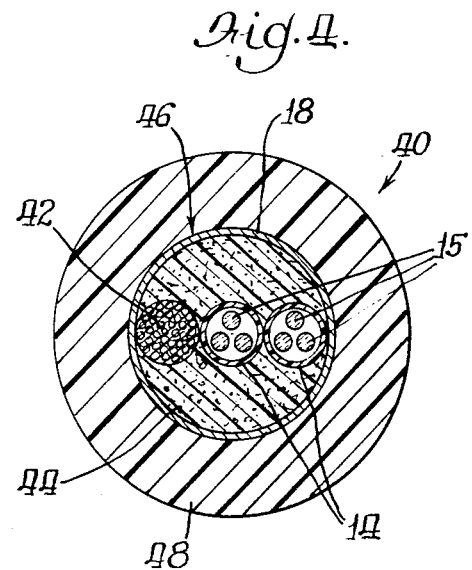
FIG. 4 is a transverse sectional view of still another alternative embodiment of a fiber optic cable construction in accordance with the present invention.

FIG. 4 illustrates still another embodiment of a fiber optic cable, indicated generally at 40, constructed in accordance with the present invention. The fiber optic cable 40 includes two fiber optic bundles 14 each of which may comprise one or more fiber optic elements 15 having a suitable sheath formed coaxially thereon as in FIGS. 2 and 3. The fiber optic bundles 14 are disposed in generally side parallel relation and are helically twisted about each other in cable fashion. The helically cabled fiber optic bundles 14 are disposed parallel to but not helically cabled with an elongate strength member 42 which is identical to the previously described elongate strength member 12. A suitable tape layer 18 is wrapped coaxially about the fiber optic bundles 14 and elongate strength member 42 to establish a cable core, indicated generally at 46. The tape layer 18 maintains the elements of the cable core in their assembled positions and provides a heat barrier for the fiber optic elements. A flexible outer coaxial jacket 48 is extruded about the core 46 in similar fashion to the jacket 22 of FIG. 2 and the jacket 38 of FIG. 3. A filler material 44, such as a suitable expanded polyurethane may be disposed about the fiber optic bundles 14 and the elongate strength member 42 prior to wrapping with the coaxial tape layer 18 and forms a substantially cylindrical outer surface about which the tape is wrapped.

Thus, in accordance with the present invention, a ruggedized fiber optic cable is provided which is flexible, exhibits high axial strength and is highly resistant to crushing while being made from non-metallic elements. The fiber optic elements are carried along a longitudinally extending strength member and retained thereon by a tape layer which provides a heat barrier for the fiber optic elements and establishes a cable core having structural integrity independent of an outer coaxial protective jacket whereby to facilitate stripping of the jacket without disturbing or injuring the fiber optic elements.

While various embodiments of the present invention have been illustrated and described, it will be obvious to those skilled in the art that changes and modifications may be made therein without departing from the invention in its broader aspects. Various features of the invention are defined in the following claims.

What is claimed is:

1. A fiber optic cable consisting of a flexible non-metallic elongate strength member extending the length of the cable, at least one fiber optic bundle comprising at least one fiber optic element having a non-metallic loose fitting tubular protective sheath substantially coaxial along the length of said fiber optic element, said protective sheath being flexible but sufficiently rigid to provide substantial crush resistance, a plurality of elongate non-metallic filler members of substantially similar transverse cross-sectional configuration and size as said fiber optic bundle, said fiber optic bundle and a sufficient number of filler members being helically cabled along said elongate strength member so that, when considered in a transverse cross section of said cable, said fiber optic bundle and filler members fully circumferentially encircle said strength member with said fiber optic bundle and filler members contacting said strength member and each next adjacent fiber optic bundle or filler member along lines of contact extending longitudinally thereof, said elongate strength member having greater tensile strength and lower elongation per unit length than said fiber optic elements, a non-metallic tape wrapped coaxially over said fiber optic bundle and said filler members and elongate strength member to secure said fiber optic bundle, filler members and elongate strength member in generally fixed but flexible relation and establish a cable core, and a non-metallic flexible protective jacket coaxially over said cable core, said tape providing a heat barrier for said fiber optic elements and maintaining said fiber optic bundle, filler members and elongate strength member in assembled relation to facilitate stripping of said jacket without disturbing said fiber optic elements.

2. A fiber optic cable consisting of a flexible non-metallic elongate strength member extending the length of the cable, at least two fiber optic bundles helically cabled about each other and disposed parallel to but not helically cabled about said elongate strength member in close proximity therewith, each of said fiber optic bundles including a fiber optic element having a loosely fitting tubular protective sheath substantially coaxial along the length of said fiber optic element, a substantially cylindrical flexible body of expanded non-metallic material formed about and along the length of said elongate strength member and fiber optic bundles and defining a substantially cylindrical outer surface, a non-metallic tape wrapped coaxially over and in contacting relation with said substantially cylindrical outer surface so as to establish a cable core, and a non-metallic flexible protective jacket coaxial over said cable core along the full longitudinal length of said cable.

3. A fiber optic cable as defined in claim 2 wherein said expanded non-metallic material comprises expanded polyurethane.

4. A fiber optic cable consisting of a flexible non-metallic elongate strength member extending the length of the cable, at least one fiber optic bundle carried by said elongate strength member along its longitudinal length, said fiber optic bundle including at least one fiber optic element having a non-metallic loose fitting tubular protective sheath substantially coaxial along the length of said fiber optic element to form said fiber optic bundle, said elongate strength member having greater tensile strength and lower elongation per unit length than said fiber optic element, a non-metallic tape wrapped about said fiber optic bundle and said elongate strength member to secure said bundle and strength member in assembled relation and establish a cable core, a non-metallic flexible layer coaxial over said cable core in contact with said tape and defining a substantially cylindrical outer peripheral surface, and a non-metallic flexible jacket coaxial over said cylindrical surface and extending along the full longitudinal length of said cable.

5. A fiber optic cable as defined in claim 4 wherein said non-metallic layer coaxial over said cable core comprises foamed plastic.

6. A fiber optic cable as defined in claim 4 wherein said elongate strength member is disposed axially of said cable core.

7. A fiber optic cable as defined in claim 4 wherein said fiber optic bundles is cabled about said elongate strength member, and including at least one elongate flexible non-metallic filler member cabled about said elongate strength member with said fiber optic bundles, said tape being coaxially disposed about said cabled fiber optic bundles, filler members and elongate strength member.

8. A method of making a fiber optic cable comprising the steps of forming at least two fiber optic bundles each of which includes a non-metallic loose fitting tubular protective sheath disposed substantially coaxially along the lengths of one or more fiber optic elements, said tubular protective sheaths being flexible but sufficiently rigid to provide substantial crush resistance, cabling at least two fiber optic bundles in spiral relation about each other along their lengths, positioning said spiraled fiber optic bundles in parallel juxtaposed relation with a non-metallic flexible elongate strength member having greater tensile strength and lower elongation per unit length than said fiber optic elements, forming a substantially cylindrical body of expanded polyurethane generally coaxially along the length of said spiraled fiber optic elements and elongate strength member so as to define a substantially cylindrical outer surface, wrapping a tape coaxially about said substantially cylindrical outer surface along the length thereof to establish a cable core, and forming a coaxial non-metallic flexible protective outer jacket over said cable core extending substantially the full longitudinal length of the cable.

9. A method of forming a fiber optic cable comprising the steps of forming a plurality of fiber optic bundles each of which includes a non-metallic loose fitting tubular protective sheath disposed substantially coaxially along the lengths of one or more fiber optic elements, said protective sheaths being flexible but sufficiently rigid to provide substantial crush resistance, cabling a plurality of said fiber optic bundles in generally helical fashion along the length of a non-metallic flexible elongate strength member having greater tensile strength and lower elongation per unit length than said fiber optic elements, said cabled fiber optic bundles being sufficient in number to fully circumferentially encircle said elongate strength member when disposed in substantially parallel relation therewith, wrapping a non-metallic tape coaxially over said fiber optic bundles and said elongate strength member to secure said fiber optic bundles and strength member in generally fixed relation and establish a cable core, forming a layer of extruded foamed plastic coaxially over said core in contacting relation with said tape and defining a substantially cylindrical outer surface, and forming a non-metallic flexible protective jacket coaxially over said foamed plastic layer, said tape providing a heat barrier for said fiber optic elements and maintaining said fiber optic bundles and elongate strength member in assembled relation to facilitate stripping of said jacket and foamed plastic layer without disturbing said fiber optic elements.

10. The method as defined in claim 9 wherein said tape is applied coaxially along said fiber optic bundle and said elongate strength member.

11. A method of forming a fiber optic cable comprising the steps of forming a non-metallic loose fitting tubular protective sheath substantially coaxially along the lengths of one or more fiber optic elements to form at least one fiber optic bundle, said protective sheath being flexible but sufficiently rigid to provide substantial crush resistance, helically cabling at least one fiber optic bundle and a sufficient number of elongate non-metallic filler members of substantially similar transverse cross-sectional configuration and size as said fiber optic bundle about said elongate strength member so that, when considered at any transverse section along the length of the cable, the fiber optic bundle and filler members fully circumferentially encircle said strength member with said fiber optic bundle and filler members contacting said strength member and each next adjacent fiber optic bundle or filler member along lines of contact extending longitudinally thereof, said elongate strength member having greater tensile strength and lower elongation per unit length than said fiber optic elements, wrapping a non-metallic tape coaxially over said fiber optic bundle and said filler members and elongate strength member to secure said fiber optic bundle, filler members and elongate strength member in generally fixed but flexible relation and establish a cable core, and forming a non-metallic flexible protective jacket coaxially over said cable core, said tape providing a heat barrier for said fiber optic elements and maintaining said fiber optic bundle, filler members and elongate strength member in assembled relation to facilitate stripping of said jacket without disturbing said fiber optic elements.

12. The method of claim 11 wherein said elongate strength member is disposed axially of said cabled fiber optic bundle and said filler members.

* * * * *